(12) United States Patent
Kim et al.

(10) Patent No.: US 8,619,213 B2
(45) Date of Patent: Dec. 31, 2013

(54) BACKLIGHT UNIT AND DISPLAY MODULE EMPLOYING THE BACKLIGHT UNIT

(75) Inventors: Hwan-Jin Kim, Yongin (KR); Min-Seop Kim, Yongin (KR); Hyo-Shin Song, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 371 days.

(21) Appl. No.: 12/912,209

(22) Filed: Oct. 26, 2010

(65) Prior Publication Data

US 2011/0170035 A1 Jul. 14, 2011

(30) Foreign Application Priority Data

Jan. 14, 2010 (KR) .......................... 10-2010-0003546

(51) Int. Cl.
*G02F 1/1335* (2006.01)
*F21V 7/04* (2006.01)

(52) U.S. Cl.
USPC .............................. 349/65; 362/612; 362/613

(58) Field of Classification Search
USPC ................. 349/65; 362/612–613, 249.02
See application file for complete search history.

(56) References Cited

U.S. PATENT DOCUMENTS

| | | | |
|---|---|---|---|
| 2002/0008806 A1 | 1/2002 | Natsuyama | |
| 2002/0043012 A1* | 4/2002 | Shibata et al. | 40/546 |
| 2005/0213321 A1* | 9/2005 | Lin | 362/231 |
| 2007/0263408 A1 | 11/2007 | Chua | |
| 2007/0273975 A1 | 11/2007 | Toshima et al. | |
| 2008/0192462 A1* | 8/2008 | Steedly et al. | 362/218 |
| 2009/0278139 A1* | 11/2009 | Fjelstad | 257/88 |
| 2010/0002465 A1* | 1/2010 | Tsang et al. | 362/612 |

FOREIGN PATENT DOCUMENTS

KR 1020080056365 A 6/2008

OTHER PUBLICATIONS

Korean Office Action issued by KIPO, dated May 23, 2011, corresponding to Korean Patent Application No. 10-2010-0003546 together with Request for Entry.

* cited by examiner

*Primary Examiner* — Nathanael R Briggs
(74) *Attorney, Agent, or Firm* — Robert E. Bushnell, Esq.

(57) ABSTRACT

A backlight unit and a display module employing the backlight unit, the backlight unit including a light guide panel for guiding light to a display apparatus for displaying an image; and a plurality of light source devices arranged in a side portion of the light guide panel, wherein the plurality of light source devices are electrically connected to each other by connecting units having conductivity. The display module may be further slimmed since the limitation due to the thickness of a light source device circuit board is eliminated.

19 Claims, 5 Drawing Sheets

BACKLIGHT UNIT AND DISPLAY MODULE EMPLOYING THE BACKLIGHT UNIT

RELATED APPLICATIONS

This application claims the benefit of Korean Patent Application No. 10-2010-0003546, filed on Jan. 14, 2010, in the Korean Intellectual Property Office, the disclosure of which is incorporated herein in its entirety by reference.

BACKGROUND

1. Field

The general inventive concept relates to a backlight unit and a display module employing the backlight unit.

2. Description of the Related Art

In general, a display apparatus, including a liquid crystal display (LCD) panel, is a light-receiving type display apparatus that does not form an image due to self-emission or self-illumination but displays the image due to an external incident light source.

The LCD panel has a backlight unit formed on its rear side that emits light. Accordingly, the LCD panel may display an image even in a dark place. Also, other than the aforementioned light-receiving type display apparatus, the backlight unit is used as a surface light source apparatus such as a light source of a signboard.

The backlight unit may be classified into a direct light type and an edge light type according to how a light source is arranged. In the direct light type, a plurality of light source devices that are arranged straight below a panel emit a light directly to the panel, and in the edge light type, a plurality of light source devices that are arranged in a side end portion of a light guide panel that emit a light and then the light is delivered to a panel via the light guide panel.

The above information disclosed in this Related Art section is only for enhancement of understanding of the background of the invention and therefore it may contain information that does not form the prior art that is already known to a person of ordinary skill in the art.

SUMMARY

Aspects of the present invention may include a backlight unit and a display module employing the backlight unit having an improved structure for electrically connecting a plurality of light source devices for emitting light to a light guide panel, whereby the display module may be further slimmed, and it is easy to re-use the plurality of light source devices.

According to aspects of the present invention, a backlight unit may include a light guide panel for guiding light to a display apparatus for displaying an image; and a plurality of light source devices arranged in a side portion of the light guide panel, wherein the plurality of light source devices are electrically connected to each other by connecting units having conductivity.

A plurality of concave-convex units may be formed along the side portion of the light guide panel, the plurality of light source devices may be arranged in the concave units, respectively, the connecting units may be formed on the convex units, respectively, and both end portions of each of the connecting units may be respectively connected to the neighboring light source devices.

Each of the plurality of light source devices may include a light source, a housing unit that contains the light source, and terminal units that are electrically connected to the light source and that are arranged on external surfaces of both side portions of the housing unit whereby the terminal units are connected to both end portions of the each of the connecting units.

Each of the connecting units may be a clip and the clip may include a base portion that is formed on an external surface of each of the convex units and that extends over from one side end to the other end of each of the convex units, and coupling portions that extend from both end portions of the base portion toward side walls of each of the convex units and that are bent at least once in a direction opposite to the extension direction whereby the coupling portions elastically contact the terminal units of the plurality of light source devices.

The connecting units may be metal plates that are insert injection molded to the convex units corresponding to the plurality of light source devices, respectively.

Each of the metal plates may include a base portion extending over from one side end to the other end of each of the convex units, and coupling portions that extend from both end portions of the base portion toward side walls of each of the convex units whereby the coupling portions contact the terminal units of the plurality of light source devices.

The connecting units may be conductive coating layers that are formed on external surfaces of the convex units.

A plurality of supporting units may be formed in the side portion of the light guide panel, the plurality of light source devices may be formed in intervals between the supporting units, the connecting units may be arranged on the supporting units, respectively, and both end portions of each of the connecting units may be respectively connected to the plurality of neighboring light source devices.

According to other aspects of the present invention, a display module may include a display apparatus for displaying an image; and a backlight unit including a light guide panel arranged below the display apparatus and guiding a light to the display apparatus; and a plurality of light source devices arranged in a side portion of the light guide panel, wherein a plurality of supporting units are formed in the side portion of the light guide panel, the plurality of light source devices are formed in intervals between the supporting units, and the plurality of light source devices are electrically connected to each other by connecting units having conductivity and arranged on the plurality of supporting units.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which, like reference symbols indicate the same or similar components, wherein.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

A conventional light source of a backlight unit may include a Cold Cathode Fluorescent Lamp (CCFL) in which electrodes at both ends of a fluorescent lamp are formed inside a tube, an External Electrode Fluorescent Lamp (EEFL) in which electrodes at both ends of a fluorescent lamp are formed outside a tube, a light emitting diode (LED), and the like. From among these alternatives, the LED has the benefit of being small and highly reliable, and has low power consumption so that the LED is widely used as a light source for the display apparatus.

Meanwhile, a LCD module may include a LCD panel for displaying an image, a backlight unit for supplying light to the LCD panel, and a circuit board for supplying a driving signal to the LCD panel and the backlight unit.

The backlight unit may include a light source device, and a light source device circuit board for mounting the light source device thereon. The light source device circuit board may be connected to a driving circuit board by performing a soldering operation so that the light source device circuit board may receive a driving signal from the driving circuit board.

However, the slimness of the display apparatus including the LCD panel in a conventional display is lacking due to the thicknesses of elements including the light source device circuit board, an attachment tape for attaching a light source device to the light source device circuit board, and the like. Accordingly, slimming of the display module is limited.

Also, due to deviations in position occurring when soldering the light source device, the brightness or uniformity of the display module deteriorates, and it is impossible to re-use the light source device due to the use of the solder.

Figure 1:
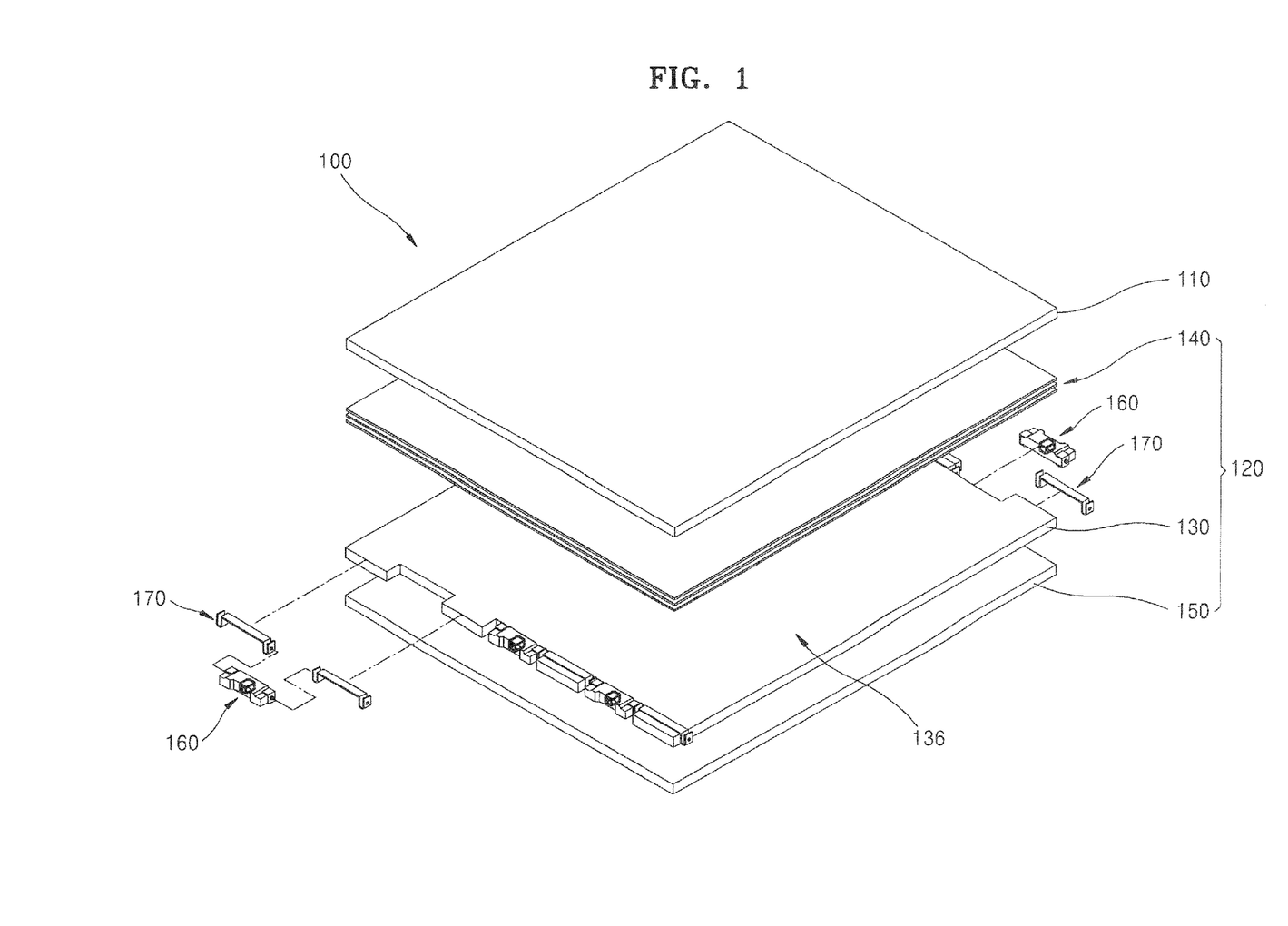
FIG. 1 is an exploded perspective view of a display module according to an embodiment of the present invention.

FIG. 1 is a diagram of a display module 100 according to an embodiment of the present invention.

Referring to FIG. 1, the display module 100 may include a liquid crystal display (LCD) panel 110, and a backlight unit 120 for supplying light to the LCD panel 110. The backlight unit 120 may include a light guide panel 130, a plurality of optical sheets 140, a reflective sheet 150, and a plurality of light source devices 160.

The LCD panel 110 includes first and second substrates, and a liquid crystal injected between the first and second substrates. With respect to an active-matrix LCD panel, a plurality of gate lines and a plurality of data lines cross in a first substrate, a thin film transistor (TFT) is formed at each intersection so as to be correspondingly connected to a pixel electrode formed in each pixel, color filters of red, green and blue colors are arranged in a second substrate, a transparent common electrode is arranged to cover the color filters, and a polarizing plate for selectively transmitting a particular light is attached on each of the external surfaces of the first and second substrates.

The light guide panel 130 may be arranged below the LCD panel 110. The light guide panel 130 functions to guide light supplied from the light source devices 160, thereby providing the light to the LCD panel 110. The light guide panel 130 may have a particular pattern so as to provide a uniform surface light source.

The optical sheets 140 are interposed between the LCD panel 110 and the light guide panel 130. The optical sheets 140 may be formed of sheets, may include a diffusion sheet and a prism sheet, and may allow the light to be incident on the LCD panel 110 as the uniform surface light source by diffusing or concentrating the light that is guided by the light guide panel 130.

Under a rear surface of the LCD panel 110, which is opposite to the optical sheets 140, the reflective sheet 150 is arranged thereon. The reflective sheet 150 functions to increase efficiency of light transmission by reflecting the light toward the LCD panel 110 once the light has passed through a rear surface of the light guide panel 130.

The light source devices 160 may be arranged in side portions of the light guide panel 130, and emit the light toward the light guide panel 130. A light source of each of the light source devices 160 may include a Cold Cathode Fluorescent Lamp (CCFL), an External Electrode Fluorescent Lamp (EEFL), a light emitting diode (LED), or the like. The light source devices 160 may use a plurality of white LEDs emitting a white-light as light sources.

Here, the light source devices 160 are electrically connected to each other by a plurality of connecting units 170 that may be separately arranged.

Figure 2:
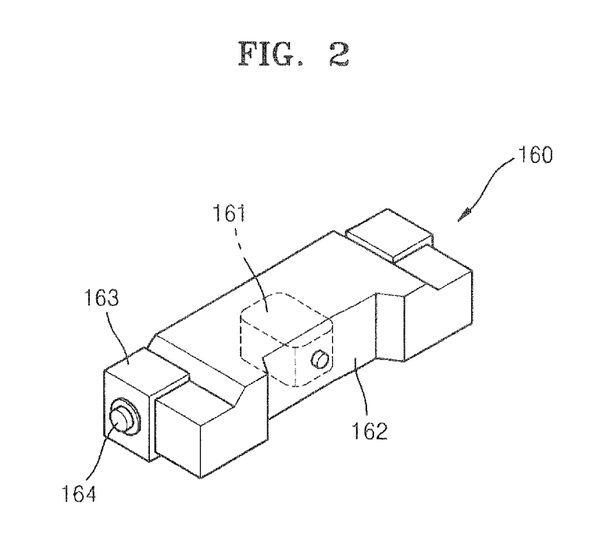
FIG. 2 is an exploded perspective view of a light source device of FIG. 1, according to an embodiment of the present invention.

FIG. 2 is a diagram of a light source device 160, according to an embodiment of the present invention.

Referring to FIG. 2, the light source device 160 may include a light source 161 such as a white LED. The light source 161 may be arranged in a housing unit 162. A terminal unit 163 may be arranged on the housing unit 162. The terminal unit 163 may be arranged on an external surface of each of both side portions of the housing unit 162, so that the terminal unit 163 surrounds each of the both side portions of the housing unit 162. The terminal unit 163 may be electrically connected to the light source 161 arranged in the housing unit 162. A protrusion unit 164 may be formed on an external surface of the terminal unit 163.

Figure 3:
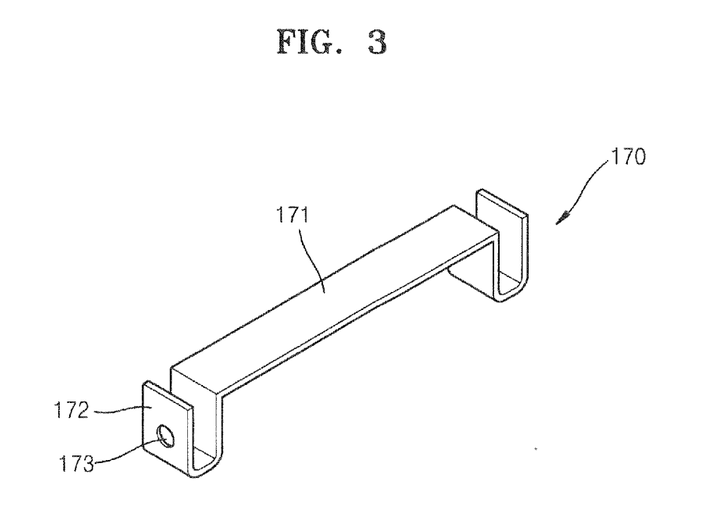
FIG. 3 is an exploded perspective view of a connecting unit of FIG. 1, according to an embodiment of the present invention.

FIG. 3 is a diagram of a connecting unit 170, according to an embodiment of the present invention.

Referring to FIG. 3, the connecting unit 170 may be formed of a conductive material by which the light source devices 160 are electrically connected to each other. In the present embodiment, the connecting unit 170 may be clip-shaped. The connecting unit 170 includes a base portion 171 that may be flat plate-shaped, and coupling portions 172 that are bent at least once from both end portions of the base portion 171. The coupling portions 172 have receiving holes 173 formed therein which may be, but not limited to "U" shaped.

Figure 4:
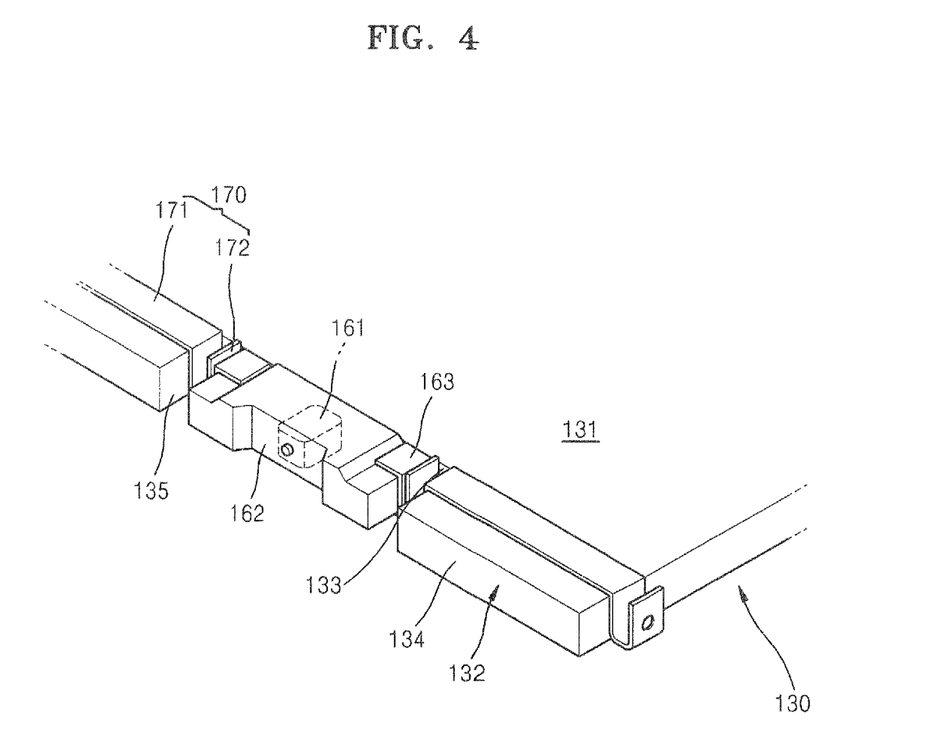
FIG. 4 is a magnified perspective view for illustrating a status in which light source devices of FIG. 1 are connected by the connecting unit of FIG. 3.

FIG. 4 is a diagram for illustrating a status in which the light source devices 160 of FIG. 1 are electrically connected by the base portion 171 of FIG. 3.

Referring to FIG. 4, a light guide portion 131 that may be flat plate-shaped is arranged in the light guide panel 130. The light guide portion 131 may be particularly patterned to provide a uniform surface light source.

For example, in order to scatter and diffuse a light incident on a surface of a transparent acryl resin, the light guide portion 131 may have a plurality of light guide patterns 136 printed thereon by using a titanium oxide having a bead form, and an ink including glass or an acryl.

In addition to the printing operation, the light guide patterns 136 may be formed by using a stamping operation that corresponds to a non-printing operation using a mold, or by using an injection molding operation. In more detail, the light guide patterns 136 may be formed in a manner that an acryl resin processed by a laser beam is vaporized so that a sawtooth-shape is formed in cross-sections of the light guide patterns 136. The minute sawtooth-shape may function as a micro-lens so as to increase scattering of the light in various angles.

The light guide patterns 136 may have a shape selected from the group comprising a dot shape formed of grooves having a predetermined depth, a quadrangle shape, a lattice shape and combinations thereof, may have a dotted shape formed of intermittent grooves each having a predetermined depth, or may have a straight line shape formed of successive grooves. Also, in order to increase a light diffusion and scattering rate as the light guide patterns 136 are distant from the light source device 160, the size of the grooves may become large, or a pitch of the grooves may become small.

A plurality of concave-convex units 133 and 134 may be formed in a side end portion 132 of the light guide portion 131. With respect to the concave-convex units 133 and 134, the concave units 133 and the convex units 134 may be repeatedly formed along the side end portion 132 of the light guide portion 131. The side end portion 132 having the concave-convex units 133 and 134 formed therein functions as a supporting unit for supporting the light source device 160.

The light source device 160 may be arranged in each of the concave units 133. When the light source device 160 is arranged in each of the spaces of the concave units 133, the terminal units 163 that are arranged on the external surfaces of the both side portions of the housing unit 162 may be positioned facing side walls 135 of the neighboring convex units 134, respectively.

The connecting unit 170 that is clip-shaped may be arranged on each of the convex units 134. The base portion 171 may be formed on a surface of each convex unit 134 in a manner that the base portion 171 extends over from one side surface to the other surface of each convex unit 134. The coupling portions 172 extend downward from both side portions of the base portion 171 along the side walls 135 of the convex unit 134, and are bent at least once in a direction opposite to the extension direction. A cross-section of each coupling portion 172 may be U-shaped. It is required that the coupling portions 172 have elasticity for smooth connection with the terminal units 163. Although the connecting unit 170 is formed to contact the terminal unit 163, a shape of the connecting unit 170 is not limited to a particular shape.

Here, for firm connection between the connecting unit 170 and the light source device 160, the protrusion unit 164 may be formed on the external surface of the terminal unit 163. Also, the receiving hole 173 for receiving the protrusion unit 164 is formed in an external surface of the coupling portion 172 to correspond to the protrusion unit 164.

The backlight unit 120 having the aforementioned elements has a configuration in which the base portion 171 may be formed along an external surface of the convex unit 134, and the coupling portions 172 contact the side walls 135 of the convex unit 134. In this manner, the connecting unit 170 may be arranged on each of the convex units 134 that are formed in the side portion 132 of the light guide portion 131. The light source device 160 may be arranged in each of the concave units 133 that are in intervals between the convex units 134. The terminal units 163 that are arranged on the external surfaces of the both side portions of the housing unit 162 may be positioned facing the side walls 135 of the neighboring convex units 134, respectively.

Accordingly, the terminal unit 163 contacts the coupling portion 172. Here, the protrusion unit 164 protruding from the external surface of the terminal unit 163 is received by the receiving hole 173 formed in the external surface of the coupling portion 172, so that the terminal unit 163 may be firmly fixed to the coupling portion 172.

Thus, when an external power source is applied to one of the connecting units 170 having conductivity, a current flows in all of the light source devices 160 arranged in the concave unit 133 and the connecting unit 170 arranged on the convex unit 134, so that the light is emitted from the light source 161 of the light source device 160 and then is provided to the light guide portion 131. The light that has been guided to the light guide portion 131 is guided to the LCD panel 110.

Figure 5:
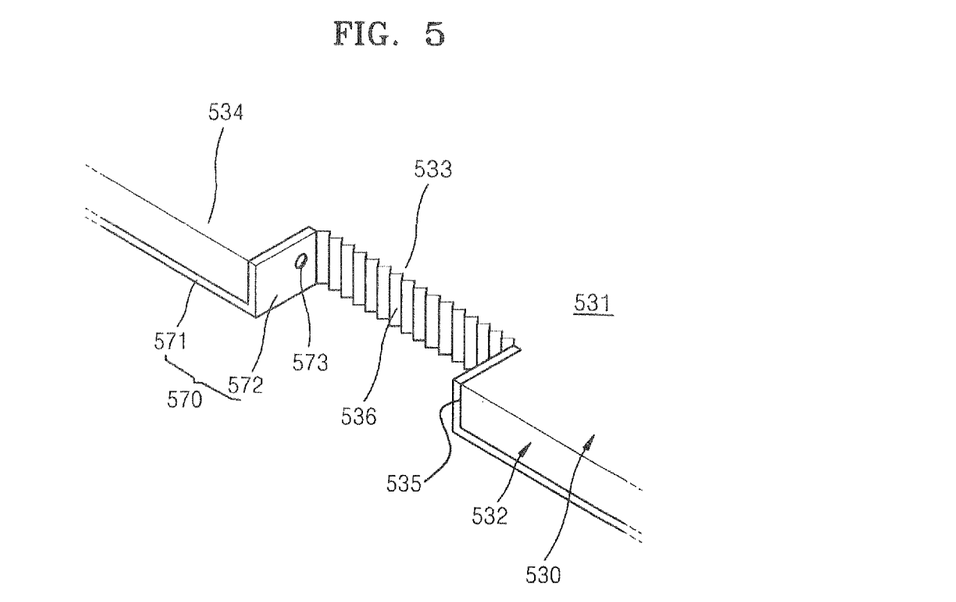
FIG. 5 is a magnified perspective view of a light guide panel having a connecting unit according to another embodiment of the present invention.
Figure 6:
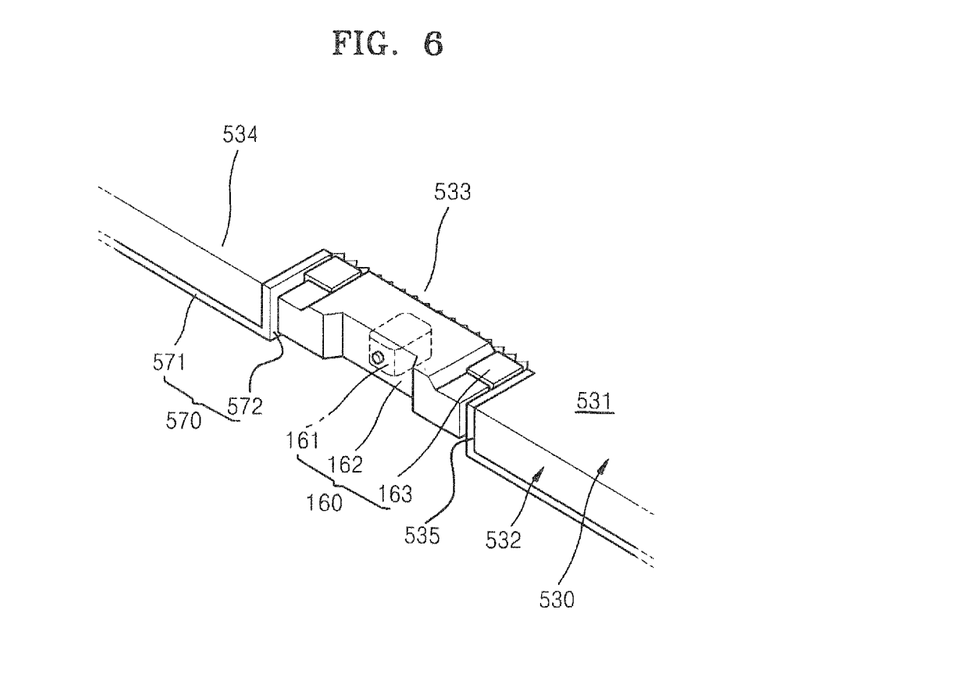
FIG. 6 is a magnified perspective view for illustrating a status in which light source devices are connected by the connecting unit of FIG. 5.

FIG. 5 is a diagram of a connecting unit 570 according to another embodiment of the present invention. FIG. 6 is a diagram for illustrating a status in which the light source devices 160 are electrically connected by the connecting units 570 of FIG. 5.

Referring to FIGS. 5 and 6, a light guide portion 531 that is flat plate-shaped is arranged in a light guide panel 530. A plurality of concave-convex units 533 and 534 are formed in a side portion 532 of the light guide portion 531 so as to function as supporting units for supporting the light source devices 160. With respect to the concave-convex units 533 and 534, the concave units 533 and the convex units 534 are repeatedly formed along the side portion 532 of the light guide portion 531.

The light source device 160 is arranged in each of the concave units 533. When the light source device 160 is arranged in each of the spaces of the concave units 533, the terminal units 163 that are arranged on the external surfaces of the both side portions of the housing unit 162 may be positioned facing side walls 535 of the neighboring convex units 534, respectively.

A sawtooth-shaped diffusion portion 536 for diffusing light toward the light guide portion 531 may further be formed on a surface of the concave unit 533 corresponding to a path through which the light from the light source 161 is emitted.

Here, the connecting unit 570 may be a metal plate that is insert injection molded to the convex unit 534. For this, the connecting unit 570 may be integrally formed with the light guide panel 530 via insert injection molding. The connecting unit 570 may be arranged widthwise on the convex unit 534, and includes a base portion 571 extending over from one side end to the other end of the convex unit 534, and coupling portions 572 U-bent from the base portion 571 to extend along the side walls 535 of the convex unit 534.

Also, for firm connection between the connecting unit 570 and the light source device 160, the protrusion unit 164 (refer to FIG. 2) protrudes from the external surface of the terminal unit 163, and a receiving hole 573 for receiving the protrusion unit 164 may be formed in an external surface of the coupling portion 572 so as to correspond to the protrusion unit 164.

Accordingly, the terminal unit 163 contacts the coupling portion 572. Here, the protrusion unit 164 protruding from the external surface of the terminal unit 163 is received by the receiving hole 573 formed in the external surface of the coupling portion 572, so that the terminal unit 163 may be firmly fixed to the coupling portion 572. Thus, when an external power source is applied to one of the connecting units 570 having conductivity, a current also flows to the light source device 160 so that the light source device 160 emits the light.

Figure 7:
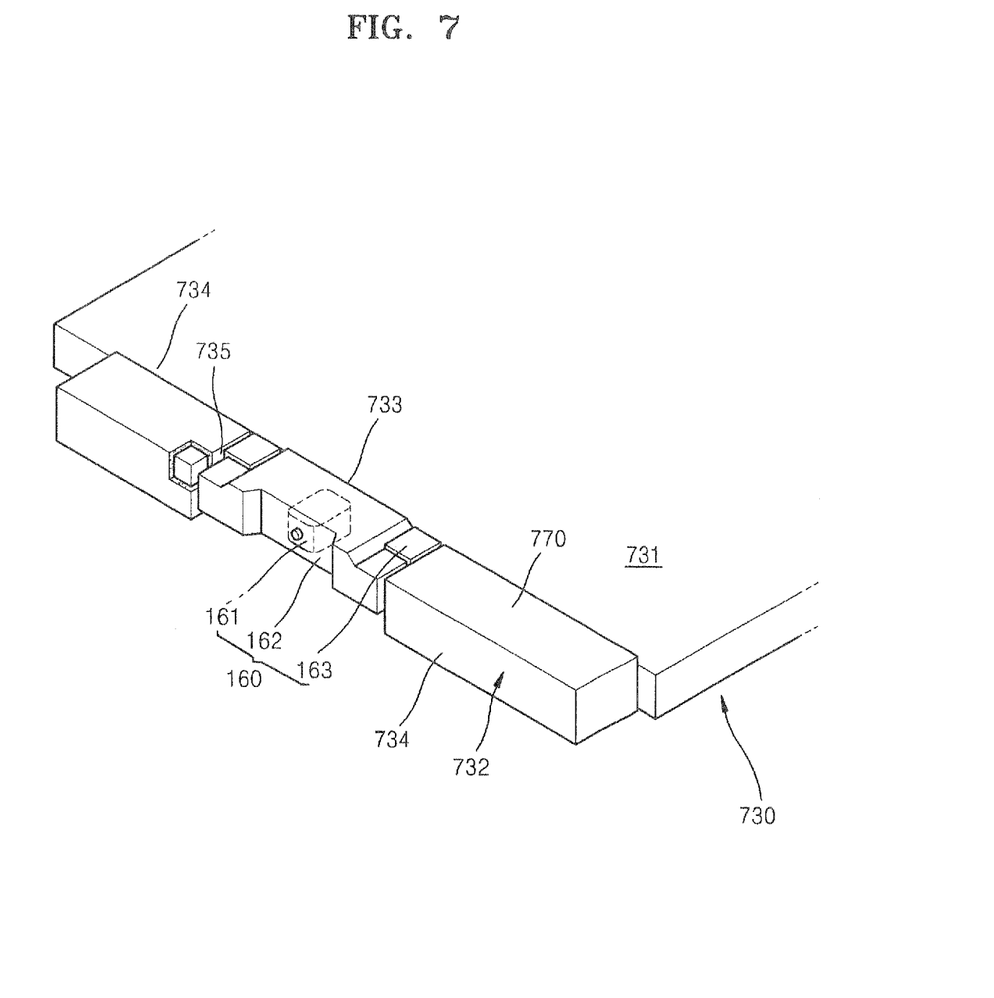
FIG. 7 is a magnified perspective view for illustrating a status in which light source devices are connected by a connecting unit according to another embodiment of the present invention.

FIG. 7 is a diagram for illustrating a status in which the light source devices 160 are electrically connected by connecting units 770 according to another embodiment of the present invention.

Referring to FIG. 7, a light guide portion 731 that is flat plate-shaped is arranged in a light guide panel 730. A plurality of concave-convex units 733 and 734 are formed in a side portion 732 of the light guide portion 731 so as to function as supporting units for supporting the light source device 160. With respect to the concave-convex units 733 and 734, the concave units 733 and the convex units 734 are repeatedly formed along the side portion 732 of the light guide portion 731.

The light source device 160 is arranged in each of the concave units 733. When the light source device 160 is arranged in each of the spaces of the concave units 733, the terminal units 163 that are arranged on the external surfaces of the both side portions of the housing unit 162 may be positioned facing side walls 735 of the neighboring convex units 734, respectively.

Here, the connecting unit 770 is a conductive coating layer formed on an external surface of the convex unit 734. That is, the connecting unit 770 is formed of a conductive material that is partly or entirely coated on the external surface of the convex unit 734 including the side walls 735 of the neighboring convex units 734, wherein the conductive material includes one selected from the group consisting of a copper-plated layer, a nickel-plated layer, a gold-plated layer, a silver-plated layer, a platinum-plated layer, and an alloy layer thereof or a multi-layer thereof.

Thus, after the terminal units 163 contact the connecting units 770, when an external power source is applied to one of the connecting units 770, the light source device 160 may emit a light.

The backlight unit having the aforementioned configuration and the display module employing the backlight unit according to the one or more embodiments of the present invention may obtain the following effects.

First, the display module may be further slimmed since the limitation due to the thickness of a light source device circuit board is eliminated.

Second, elements, including an attachment tape for attaching the light source device to the light source device circuit board, are not necessary so that processes or the number of elements may be reduced, and thus the display module may be further slimmed.

Third, a soldering operation on the light source device is not necessary so that the brightness of the display module or uniformity deviation of the display module is improved, and it is easy to separate the light source devices from the display module It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A backlight unit, comprising:
   a light guide panel having an upper surface, a lower surface and four side surfaces for guiding light to a display apparatus for displaying an image;
   a plurality of light source devices arranged
   at intervals on at least one side of the four side surfaces of the light guide panel, said plurality of light source devices being each contained in a housing, said housing having two terminal units with each terminal unit having a protrusion unit; and;
   a plurality of connecting units composed of an electrically conductive material arranged at intervals on said at least one side of the four side surfaces of the light guide panel between each of the plurality of light source devices, each of said plurality of connecting units having a coupling portion at opposite ends of a base portion, each of said coupling portions having a receiving hole for receiving the protrusion unit and formed in an external surface of each of the coupling portions.

2. The backlight unit of claim 1, wherein
   the terminal units are connected to both end portions of the each of the connecting units.

3. The backlight unit of claim 2, wherein the light source comprises a light emitting diode (LED).

4. The backlight unit of claim 2, wherein each of the connecting units is a clip.

5. The backlight unit of claim 4, wherein the
   base portion is formed on an external surface of each of the convex units and that extends over from one side end to the other end of each of the convex units; and
   the coupling portions that extend from both end portions of the base portion toward side walls of each of the convex units and that are bent at least once in a direction opposite to the extension direction, the coupling portions elastically contact the terminal units of the plurality of light source devices.

6. The backlight unit of claim 5, further comprising:
   the protrusion unit is formed on an external surface of each of the terminal units, and
   the receiving hole for receiving the protrusion unit is formed in an external surface of each of the coupling portions.

7. The backlight unit of claim 2, wherein the connecting units are metal plates that are insert injection molded to the convex units corresponding to the plurality of light source devices, respectively.

8. The backlight unit of claim 7, wherein
   the base portion extending over from one side end to the other end of each of the convex units; and
   the coupling portions that extend from both end portions of the base portion toward side walls of each of the convex units, the coupling portions contact the terminal units of the plurality of light source devices.

9. The backlight unit of claim 8, further comprising:
the protrusion unit is formed on an external surface of each of the terminal units; and
the receiving hole for receiving the protrusion unit is formed in an external surface of each of the coupling portions.

10. A backlight unit, comprising:
a light guide panel for guiding light to a display apparatus for displaying an image; and
a plurality of light source devices arranged in a side portion of the light guide panel,
wherein the plurality of light source devices are electrically connected to each other by connecting units having conductivity,
wherein a plurality of concave-convex units are continuously disposed along the side portion of the light guide panel,
wherein the plurality of light source devices are arranged in the concave units, respectively,
wherein the connecting units are formed on the convex units, respectively, and
wherein both end portions of each of the connecting units are respectively connected to the neighboring light source devices,
wherein each of the plurality of light source devices includes a light source, a housing unit that contains the light source, and terminal units that are electrically connected to the light source, and
wherein the connecting units are conductive coating layers that are formed on external surfaces of the convex units.

11. A backlight unit, comprising:
a light guide panel for guiding light to a display apparatus for displaying an image;
a plurality of light source devices arranged in a side portion of the light guide panel, the plurality of light source devices are electrically connected to each other by connecting units having conductivity, said plurality of light source devices being each contained in a housing, said housing having two terminal units with each terminal unit having a protrusion unit;
a plurality of supporting units are formed in the side portion of the light guide panel, wherein the plurality of light source devices are formed in intervals between the supporting units, the connecting units are arranged on the supporting units, respectively, and both end portions of each of the connecting units are respectively connected to the plurality of neighboring light source devices; and
a plurality of connecting units composed of an electrically conductive material arranged at intervals on said at least one side of the four side surfaces of the light guide panel between each of the plurality of light source devices, each of said plurality of connecting units having a coupling portion at opposite ends of a base portion, each of said coupling portions having a receiving hole for receiving the protrusion unit and formed in an external surface of each of the coupling portions.

12. The backlight unit of claim 11, wherein
the terminal units that are electrically connected to the light source and that are arranged on external surfaces of both side portions of the housing unit, the terminal units are connected to each of the connecting units.

13. The backlight unit of claim 11, wherein the connecting units are clips arranged on external surfaces of the supporting units, and having both end portions that are arranged in a same direction as the arrangement of the plurality of light source devices, the clips elastically contact cross-sections of the plurality of light source devices.

14. The backlight unit of claim 13, further comprising:
the protrusion unit is formed on an external surface of each of terminal units of the plurality of light source devices; and
the receiving hole for receiving the protrusion unit is formed in each of the clips facing the protrusion unit.

15. The backlight unit of claim 11, wherein the connecting units are metal plates that are insert injection molded to the supporting units corresponding to the plurality of light source devices, respectively.

16. The backlight unit of claim 15, further comprising:
the protrusion unit is formed on an external surface of each of the terminal units, and
the receiving hole for receiving the protrusion unit is formed in each of the coupling portions facing the protrusion unit.

17. A backlight unit, comprising:
a light guide panel for guiding light to a display apparatus for displaying an image;
a plurality of light source devices arranged in a side portion of the light guide panel,
wherein the plurality of light source devices are electrically connected to each other by connecting units having conductivity; and
wherein a plurality of supporting units are formed in the side portion of the light guide panel,
wherein the plurality of light source devices are formed in intervals between the supporting units,
wherein the connecting units are arranged on the supporting units, respectively,
wherein both end portions of each of the connecting units are respectively connected to the plurality of neighboring light source devices,
wherein each of the plurality of light source devices include a light source, a housing that contains the light source, and terminal units that are electrically connected to the light source and that are arranged on external surfaces of both side portions of the housing unit, the terminal units are connected to each of the connecting units,
wherein the connecting units are conductive coating layers that are formed on external surfaces of the supporting units.

18. The backlight unit of claim 1, further comprising:
a plurality of optical sheets are arranged on a surface of the light guide panel facing the display apparatus; and
a reflective sheet is arranged on the other surface of the light guide panel, wherein the other surface is opposite to the display apparatus.

19. A display module, comprising:
a display apparatus for displaying an image; and
a backlight unit, comprising:
a light guide panel having an upper surface, a lower surface and four side surfaces, said upper surface facing said display apparatus;
a plurality of light source devices arranged at intervals on at least one side of the four side surfaces of the light guide panel, said plurality of light source devices being each contained in a housing, said housing having two terminal units with each terminal unit having a protrusion unit;
a plurality of supporting units composed of an electrically conductive material arranged at intervals on said at least one side of the four side surfaces of the light guide panel between each of the plurality of light source devices, each of said plurality of supporting units having a coupling portion at opposite ends of a base portion, each of said coupling portions having a coupling hole;

a plurality of concave units formed in said at least one side of the four side surfaces of the light guide panel, the plurality of light source devices are arranged within the plurality of concave units; and a plurality of convex units formed in said at least one side of the four side surfaces of the light guide panel, each of the base portion of the plurality of connecting units are formed on the convex units, wherein each of the plurality of light source devices are electrically connected to each other by inserting the protrusion unit of each of the plurality of light source devices into the coupling hole of each of the plurality of supporting units, and wherein the base portion of the plurality of connecting units is formed on an external surface of each of the convex units and extends over opposite ends of each of the plurality of convex units and said coupling portions that extend from both end portions of the base portion toward side walls of each of the convex units have a "U" shape to elastically contact the terminal units of the plurality of light source devices.

* * * * *